Patented Mar. 14, 1950

2,500,770

UNITED STATES PATENT OFFICE 2,500,770

METHOD OF MAKING WATER-SOLUBLE MATERIALS WATER REPELLENT

Jerry A. Pierce, Baton Rouge, La., assignor to Standard Oil Development Company, a corporation of Delaware No Drawing. Application March 14, 1947, Serial No. 734,858

8 Claims. (Cl. 99—143)

This invention relates to a process of coating water-soluble solid materials which are in the form of powder, crystals, granules, etc. to render them water repellent. More particularly, the invention relates to a process of coating water-soluble solid materials to render them water repellent without affecting the water solubility of the material coated. It is specifically concerned with the process of rendering water-soluble solid materials water repellent without affecting the water solubility of the materials by incorporating on the water-soluble solid material a thin coating of an organo-silicon compound, particularly the halogen, alkyl or haloalkyl derivatives of silicon, such as methyl silane, chloromethylsilane, etc.

Most of the organo-silicon compounds suitable for my invention are well known in the art and available commercially. For example, methods of preparing organo-silicon halides, esters, etc. are described in the following U. S. patents, viz., 2,380,995–6, 7, 8, 9, 2,405,988 etc.

The art of rendering materials water repellent is fairly well developed and processes are known whereby such materials as metals, glass, wood, paper, cloth, mica, cellophane, etc. may be rendered water repellent by treatment with such materials as wax, rubber, rubber-wax mixtures, soaps, plasticized polymers, resinous materials, etc. The material is usually rendered water repellent by passing it through a solution of the water repellent and drying the coated article to remove the solvent in which the water repellent was dissolved. Or, the material to be rendered water repellent may be subjected to the action of vapors of the water repellent agent whereby the vaporized material forms a coating on the material to be treated.

It is also known that materials such as metals, glass, wood, paper, cloth, etc. may be rendered water repellent by contacting with a vapor comprising an organo-silicon halide. Such a process is described in U. S. 2,306,222 issued December 22, 1942 to Winton I. Patnode. My invention comprises an improvement over the process described in this patent and a modification thereof in that I have found that these same organo-silicon halides and other compounds may also be used to render normally solid water-soluble materials water repellent and at the same time not affect the solubility of these materials.

It is an object of this invention therefore, to provide a method whereby normally solid water-soluble materials are rendered water repellent.

It is a further object of this invention to render a normally water-soluble material water repellent without affecting the water solubility of the material so rendered water repellent.

This invention may be more readily understood by those skilled in the art by reference to the following statement of purpose:

It is known that many normally solid, water-soluble materials, e. g. common salt, have a tendency more or less to take on water when exposed to the atmosphere. Some solids possess this tendency to a greater degree than others, and this tendency is again exhibited more sharply in moist atmospheres than in dry areas. The phenomenon of deliquescence is well known to the skilled chemist and forms a basis for simple experiment in the ordinary chemical laboratory course. Suffice it to say that many solid materials will absorb water from the atmosphere and become wetted therewith and, in the case of highly deliquescent materials even dissolve therein. It is highly necessary therefore that materials possessing these water-absorbing characteristics be kept, before being put to actual use, in storage under conditions whereby the presence of moisture is excluded entirely or kept at a low maximum. Maintaining moisture-free atmosphere for these materials is often burdensome, expensive and insecure. By application of my invention, these normally solid water-soluble materials may be rendered water repellent and stored without precaution until the materials are actually required for immediate use.

It is therefore another object of this invention to prevent the deliquescence of normally solid water-soluble materials without destroying the physical or chemical properties for which the materials may be desirable but which would be destroyed by deliquescence.

I have discovered that normally water-soluble solid materials may be rendered water repellent by a simple procedure whereby the material to be protected is momentarily exposed to the vapors of the protecting agent, e. g. a methylsilicon chloride or mixtures of the methylsilicon chlorides. This coated solid body is resistant to water in dilute concentration such as in amounts normally present in the atmosphere, however, when subjected to the influence of water in bulk, the coated material retains its solubility characteristics and undergoes solution. The treatment may be carried out at any temperature at which the organo-silicon compound vaporizes without decomposition.

This invention is applicable to the treatment of any normally solid water-soluble material which possesses a tendency to absorb water from the atmosphere or from other sources. The invention may be applied to the treatment of ordinary chemical solids, e. g. salts, such as ammonium nitrate, crude common table salt (sodium chloride), candy particularly stick candy, fruit lozenges, cough drops, medicinal pills and tablets, and the like.

My invention also finds particular application in the field of fertilizers and plant aids such as plant hormones etc. These materials are usually applied to the soil in solid form. It often happens that sudden heavy rain or a continuous rainfall of appreciable extent will dissolve and wash away these materials before they have an opportunity to dissolve and penetrate into the soil to feed the plant roots etc. By the application of my invention whereby these normally solid water-soluble fertilizers etc. are coated with the vapors of a vaporizable organo-silicon compound, the water-soluble bodies are rendered water repellent and thereby resist the washing action of heavy sudden rain which normally immediately dissolves and washes away these water-soluble bodies before an opportunity is afforded them to carry out their desired function. It is to be noted that the coating applied does not affect the solubility (in water) of the material coated but only its rate of solution. Thus in areas where rainfalls are particularly heavy a thicker coating than is usual may be applied. At any rate this invention provides a measure of safety against loss of valuable applied solid fertilizers etc. by heavy and sudden rainfall.

The process employed in my invention may be more clearly understood by those skilled in the art by reference to the following examples:

*Example I*

A small evaporating dish was placed on the "table" of a glass desiccator. Through a rubber stopper placed in the neck of the lid of the desiccator was put a small glass funnel. A 20 cc. beaker containing methyltrichlorosilane was placed at the bottom of the desiccator underneath the evaporating dish. Fumes of methyltrichlorosilane (methyl silicon trichloride) were evolved and displaced the air in the desiccator. Ordinary table salt (untreated by magnesium oxide or other commonly used compounds) was then flowed slowly through the funnel and was received by the evaporating dish. In this experiment about 2 cc. of methyltrichlorosilane was used for about 50 grams of salt. However, this method is crude and is not representative of the proper quantities.

The treated salt and an untreated control were placed side by side on a desk for several weeks during very humid weather. The untreated salt liquified to a brine, whereas the treated salt was granular and uncaked when finally inspected. It was noticed that during the first day the treated salt caked slightly, but could be crumbled between the fingers and did not cake again.

The table salt was first dried in a Freas oven at 236° F. to remove any water that might have been contained therein. Samples were then placed in small gas adsorbing flasks and fumes of methyltrichlorosilane were drawn through by suction. One sample was exposed 1 minute and the others 5 and 15 minutes. The 1 minute sample was as satisfactory as the others. They and a control were exposed for two days at a humidity percentage estimated at 90. The control caked to a hard lump but the treated samples had not changed.

The 1, 5, 15 minute and control samples (above) were placed in a covered desiccator which contained a dish of water. All become saturated with water from dripping. However, the control dried to a hard cake. The treated samples dried to a granular form and could not be distinguished from the original.

The treated table salt was placed in an ordinary salt shaker and the untreated salt in another. It was observed that the treated salt could be shaken from its container smoothly and freely, even in moist humid weather, while the untreated salt caked and could not be so removed.

The treatment of the solid body to render it water repellent may be carried out in a batch, continuous or semi-continuous manner which provides for intimate contact between the vapors and the material to be coated. A continuous method would embrace a revolving drum through which the salt and the vapor moved countercurrent. A mono-molecular film of the silane formed on the surface of the solid body is sufficient for ordinary purposes.

In large scale application of the coating to normally water-soluble solid bodies, the treatment may be applied by allowing the solid powdered or granular material to descend through a tube or similar vessel provided with baffles to partially impede its flow. The vapors of the treating agent are allowed to pass upwardly through the vessel providing intimate contact with the downwardly flowing solid which thereby become coated with the water repellent material. The flow of the water repellent vapors may be aided by blowing with an inert gas such as nitrogen.

It is evident therefore, from the above example, that the salt was rendered sufficiently water repellent to resist caking, lumping or deliquescence in moist climates or in any humid atmosphere.

*Example II*

Half of a package of commercial cough drops was exposed momentarily to fumes of a mixture of methylsilicon chlorides. The treated half and the untreated half package were exposed in open containers to a humid atmosphere for 24 hours. The treated cough drops were found to be dry whereas the control cough drops were sticky and were clumped together. However, when they were tasted no difference between the two was found either in taste or apparent solubility.

Although I have described my invention with particular reference to the treatment of normally water-soluble solid materials with vapors of an alkyl silicon chloride, e. g. methylsilicontrichloride, dimethyldichlorosilane etc., it will be readily understood by those skilled in the art, vapors of other organo-silicon halides or mixtures of two or more organo-silicon halides may be employed as the treating agent. Typical materials which may be employed in the organo-silicon series are: alkylsilicon halides, e. g. methylsilicon halides, ethylsilicon halides, etc., arylsilicon halides, e. g. phenylsilicon halides, aryl alkyl silicon halides, e. g. phenylmethylsilicon halides, etc., alkaryl silicon halides, e. g. tolylsilicon halides, etc. In choosing the particular material to be used, one should be picked which does not decompose upon heating. Bromine, iodine and fluorine derivatives may be employed as well as the chlorine compounds.

It will be observed therefore from the description of this invention that a process has been outlined whereby normally solid water-soluble materials are rendered water repellent by incorporating thereon a thin coating of water repelling agent, said coating being sufficient to keep water out but not sufficiently thick to destroy or permanently affect the water solubility of the material coated. In other words, the material is not completely waterproofed but simply sufficiently coated to prevent deliquescence. In other words, the coated solid which is water-soluble is sufficiently protected against the action of water in dilute concentrations such as is present in the moisture particularly in humid climates. But, however, when subjected to the actions of water in bulk, e. g. shaking coated table salt on water surface, the solid body retains its solubility characteristics and undergoes solution. The rate of solution may be slightly retarded by the action of the thin film coating but the coating is sufficient to account for the prevention of deliquescence of the solid body when subjected to moisture in such concentrations as is found in air particularly in moist and humid areas.

What is claimed is:

1. A hygroscopic water-soluble solid body having incorporated on the surface thereof, a thin coating of a vaporizable organo-silicon halide whereby the body is rendered non-hygroscopic without destroying its water solubility.

2. The process of treating a hygroscopic water-soluble solid body which comprises contacting said body with the vapors of an organo-silicon halide whereby the body is rendered non-hygroscopic without destroying its water solubility.

3. Process according to claim 2 in which the organo-silicon halide is methylsilicon chloride.

4. The process of treating common salt by which common salt is rendered non-hygroscopic without destroying its water solubility, which comprises contacting said common salt with the vapors of an organo silicon halide.

5. The process of treating common salt according to claim 4 in which the organo silicon halide is methylsilicon chloride.

6. A hygroscopic water-soluble solid body having incorporated on the surface thereof a coating of an organo-silicon halide whereby the body is rendered non-hygroscopic without destroying its water solubility.

7. Common salt having incorporated on the surface thereof a coating of an organo-silicon halide whereby the salt is rendered non-hygroscopic without destroying its water solubility.

8. Ammonium nitrate having incorporated on the surface thereof a coating of an organo-silicon halide whereby the nitrate is rendered non-hygroscopic without destroying its water solubility.

JERRY A. PIERCE.

REFERENCES CITED

The following references are of record in the file of this patent:

UNITED STATES PATENTS

| Number | Name | Date |
|---|---|---|
| 1,310,037 | Snelling | July 15, 1919 |
| 2,183,173 | Segura | Dec. 12, 1939 |
| 2,234,484 | Weinig | Mar. 11, 1941 |
| 2,306,222 | Patnode | Dec. 22, 1942 |
| 2,412,470 | Norton | Dec. 10, 1946 |